United States Patent
Liu et al.

(10) Patent No.: US 7,974,240 B2
(45) Date of Patent: Jul. 5, 2011

(54) CELLULAR NETWORK BASED ON RELAY STATION AND SPACE DIVISION DUPLEX COMMUNICATION METHOD

(75) Inventors: Jingxiu Liu, Beijing (CN); Zhengang Pan, Beijing (CN); Lan Chen, Beijing (CN)

(73) Assignee: NTT Docomo, Inc., Tokyo (JP)

( * ) Notice: Subject to any disclaimer, the term of this patent is extended or adjusted under 35 U.S.C. 154(b) by 1028 days.

(21) Appl. No.: 11/827,178

(22) Filed: Jul. 10, 2007

(65) Prior Publication Data

US 2008/0013520 A1    Jan. 17, 2008

(30) Foreign Application Priority Data

Jul. 12, 2006    (CN) .......................... 2006 1 0101876

(51) Int. Cl.
*H04B 7/212* (2006.01)
(52) U.S. Cl. ........ 370/329; 370/315; 370/328; 370/338; 370/492; 370/501; 455/450; 455/509; 455/13.1
(58) Field of Classification Search .................. 370/329, 370/328, 210, 344, 203; 455/11.1, 7, 69, 455/574
See application file for complete search history.

(56) References Cited

U.S. PATENT DOCUMENTS

| | | | |
|---|---|---|---|
| 6,324,184 B1 * | 11/2001 | Hou et al. | 370/468 |
| 2004/0165676 A1 | 8/2004 | Krishnan | |
| 2005/0221755 A1 | 10/2005 | Falconer | |
| 2005/0286408 A1 * | 12/2005 | Jin et al. | 370/208 |
| 2006/0003703 A1 * | 1/2006 | Yahagi | 455/69 |
| 2007/0010196 A1 * | 1/2007 | Periyalwar et al. | 455/7 |
| 2007/0099571 A1 * | 5/2007 | Withers et al. | 455/67.11 |
| 2008/0075178 A1 * | 3/2008 | Lappetelainen et al. | 375/260 |

(Continued)

FOREIGN PATENT DOCUMENTS

| | | |
|---|---|---|
| WO | WO2004/102891 | 11/2004 |
| WO | WO2005/064872 | 7/2005 |

(Continued)

OTHER PUBLICATIONS

European Search report dated Feb. 19, 2009, App. No. 08018910.3-2412, 10 pages.

(Continued)

*Primary Examiner* — Kamran Afshar
*Assistant Examiner* — Shahriar Behnamian
(74) *Attorney, Agent, or Firm* — Blakely, Sokoloff, Taylor & Zafman LLP

(57) ABSTRACT

A cellular network that is based on relay station and a space division duplex communication method are disclosed. The cellular network based on RS includes a base station, a RS and a UE, wherein the base station has at least one antenna and the RS has at least two antennas. The base station allocates resources for the UE, transmits a downlink signal in a current slot and receives an uplink signal from the UE through the RS in a next slot; the RS receives the downlink signal from the base station and the uplink signal from the UE in the current slot and transmits the received downlink signal to the UE and the uplink signal to the base station in the next slot; the UE transmits the uplink signal in the current slot and receives the downlink signal through the RS in the next slot, wherein the uplink signal and the downlink signal transmitted in the same slot are orthogonal. With the cellular network and the communication method of embodiments of the present invention, the use efficiency of each channel can be improved effectively and the system complexity can be reduced.

11 Claims, 13 Drawing Sheets

U.S. PATENT DOCUMENTS

2009/0047898 A1* 2/2009 Imamura et al. .................. 455/7
2009/0268662 A1* 10/2009 Larsson et al. ................ 370/328

OTHER PUBLICATIONS

Rankov, et al., "Spectral Efficient Signaling for Half-Duplex Relay Channels," Signals, Systems and Computers, 2005 Conference Record of the thirty-ninth Asilomar Conf. on . Pacific Grove, CAlifornia , IEEE, ISBN: 1-4244-0131-3, pp. 1066-1071.

Munoz, et al, "Non-Regenerative MIMO Relaying with Channel Stete Information," Acoustics, Speech, and Signal Porcessing 2005 IEEE ISBN: 0-7803-8874-7, pp. 361-364.

Rankov, B., et al., "Achievable Rate Regions for the Two-way Relay Channel," Information Theory, 2006 IEEE Inter. Symposium, URL: http://ieeexplore.ieee.org/xpls/abs_a1, pp. 1668-1672.

* cited by examiner

CELLULAR NETWORK BASED ON RELAY STATION AND SPACE DIVISION DUPLEX COMMUNICATION METHOD

PRIORITY

The present application claims priority to and incorporates by reference the entire contents of Chinese priority document 200610101876.0, filed in China on Jul. 12, 2006.

FIELD OF THE INVENTION

The present invention relates to a wireless communication technology, especially to a cellular network based on relay station and a space division duplex communication method.

BACKGROUND OF THE INVENTION

A future cellular network has characteristics of high data transmission rate and large covering area. According to requirements specified in ITU-R M1645, the data rate must reach 1 Gbps for a user moving in low speed or being in stationary status, and 100 Mbps for a user moving in high speed.

Generally when a power of a transmitter remains constant, energy of each bit is in inverse ratio with the data rate, i.e. with an increase of data rate, the SNR Eb/No will decrease linearly, which can result in a failure reception of the receiver and therefore a covering area is reduced.

Furthermore, a working band of Third Generation Wireless Communication (3G) is 2 GHz. However, the working band available for Next Generation Network (NGN) is higher than that of 3G, for example 5 GHz. The high working band results in more path loss and is more sensitive to fading, which deteriorate the performance of the covering area.

A relay station (RS) is one of effective methods to solve the above problem. A principle of the RS is to sacrifice capacity for covering area. Because of the limit of resource orthogonality, the RS cannot transmit and receive different signals on the same frequency and code channel at the same time. That is, the transmitting and receiving of the RS must be orthogonal, using different time and frequency. Furthermore, because of the near-far effect, the RS cannot transmit and receive different signals on different code channels at the same time.

The following is a basic principle of the work of a RS with reference to the downlink of the time division duplex.

In a traditional cellular network, a base station (BS) and a user equipment (UE) can always use a slot resource allocated to the UE to transmit/receive signals. However, in a cellular network based on RS, the slot resource allocated to the UE can be divided into two parts, one for transmission from a BS to a RS and the other for transmission from the RS to a UE. Thus when a transmitting power is constant, a throughput of the cellular network based on RS is half of that of the traditional network. The above is an explanation of sacrificing capacity for covering area by using RS. The network based on RS can expand the covering area and when transmission distances are the same, it equals to reducing power loss.

In addition, the RS has advantages of low cost and easy rollout. Besides a base station equipment, a power source and a machine room, the establishment of a base station needs a fiber network that costs a lot. In contrast, the equipment of the RS is simpler than that of the base station and the RS connects with the base station through a wireless link without the need of a fiber network, which reduces the cost of network expansion.

Channel multiplexing is one important way to improve the use efficiency of each channel and the system capacity. As viewed from the system level, a channel can be multiplexed between different multi-hop users or between a multi-hop user and a one-hop user; as viewed from the link level, a channel can be multiplexed between the uplink and the downlink of one multi-hop user.

FIG. 1 is a diagram showing a principle of a first communication method in a cellular network based on RS in prior art. As shown in FIG. 1, an uplink (UL) and a downlink (DL) need to occupy independent resources. For a two-hop user, taking time division duplex as an example, all together 4 independent slots are needed and for uplink (UL1, UL2) and downlink (DL1, DL2) respectively. In this case, as shown in FIG. 2, the use efficiency of each channel is only 1 link/slot, which is very low.

In order to improve the use efficiency of each channel, an improved duplex method is proposed, as shown in FIG. 3. FIG. 3 is a diagram showing a principle of a second communication method in a cellular network based on RS in prior art. In the first slot, a signal Xd is transmitted on downlink DL1 from a base station to a RS. In the second slot, a signal Xu is transmitted on uplink UL1 from a UE to the RS, and after the RS receives and decodes the downlink signal Xd and the uplink signal Xu, it combines the uplink and downlink signals to one signal Xc by a XOR operation. In the third slot, the RS transmits the combined signal Xc to the base station and the UE through the uplink UL2 and the downlink DL2 respectively and the base station and the UE can receive the signal Xc at the same time. After receiving and decodes the signal Xc, the base station performs the XOR operation on the signal Xc and the signal Xd transmitted in the first slot by the base station and gets the signal Xu, which is transmitted to the base station from the UE. The UE performs the same operation, i.e. it performs the XOR operation on the signal Xu transmitted in the second slot by the UE and the signal Xc received in the third slot by the UE and gets the signal Xd from the base station.

As shown in FIG. 4, after the above processing, four links (DL1, UL1, DL2 and UL2) can be transmitted in three slots and the use efficiency of each channel is 4 links/3 slots. Compared with the prior art in FIG. 1, the one in FIG. 4 can improve the use efficiency of each channel effectively and thus improve the network performance.

However, applications in a space domain are not mentioned in the second communication method and when applied in the space domain, the second method is not the optimal solution in improving the use efficiency of each channel.

SUMMARY OF THE INVENTION

A cellular network based on relay station and space division duplex communication method is described. In one embodiment a cellular network based on relay station, comprising a base station, a relay station and a user equipment, wherein the base station has at least one antenna and the relay station has at least two antennas, wherein, the base station allocates resources for the user equipment, transmits a downlink signal in a current slot and receives an uplink signal from the user equipment through the relay station in the next slot; the relay station receives the downlink signal from the base station and the uplink signal from the user equipment in the current slot and transmits the received downlink signal to the user equipment and the uplink signal to the base station in the next slot; the user equipment transmits the uplink signal in the current slot and receives the downlink signal through the relay station in the next slot, wherein the uplink signal and the downlink signal transmitted in the same slot are orthogonal.

DETAILED DESCRIPTION OF THE INVENTION

Figure 1:
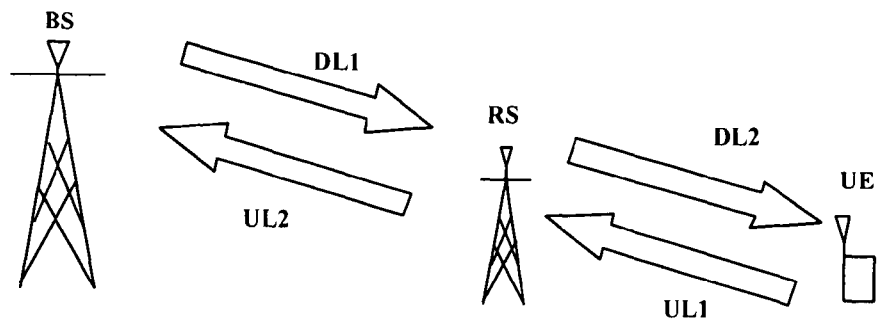
FIG. 1 is a diagram showing a principle of a first communication method in a cellular network based on RS in prior art.
Figure 2:
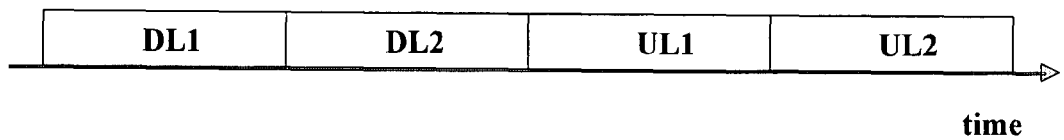
FIG. 2 is a schematic diagram showing a slot allocation in the communication method shown in FIG. 1.
Figure 3:
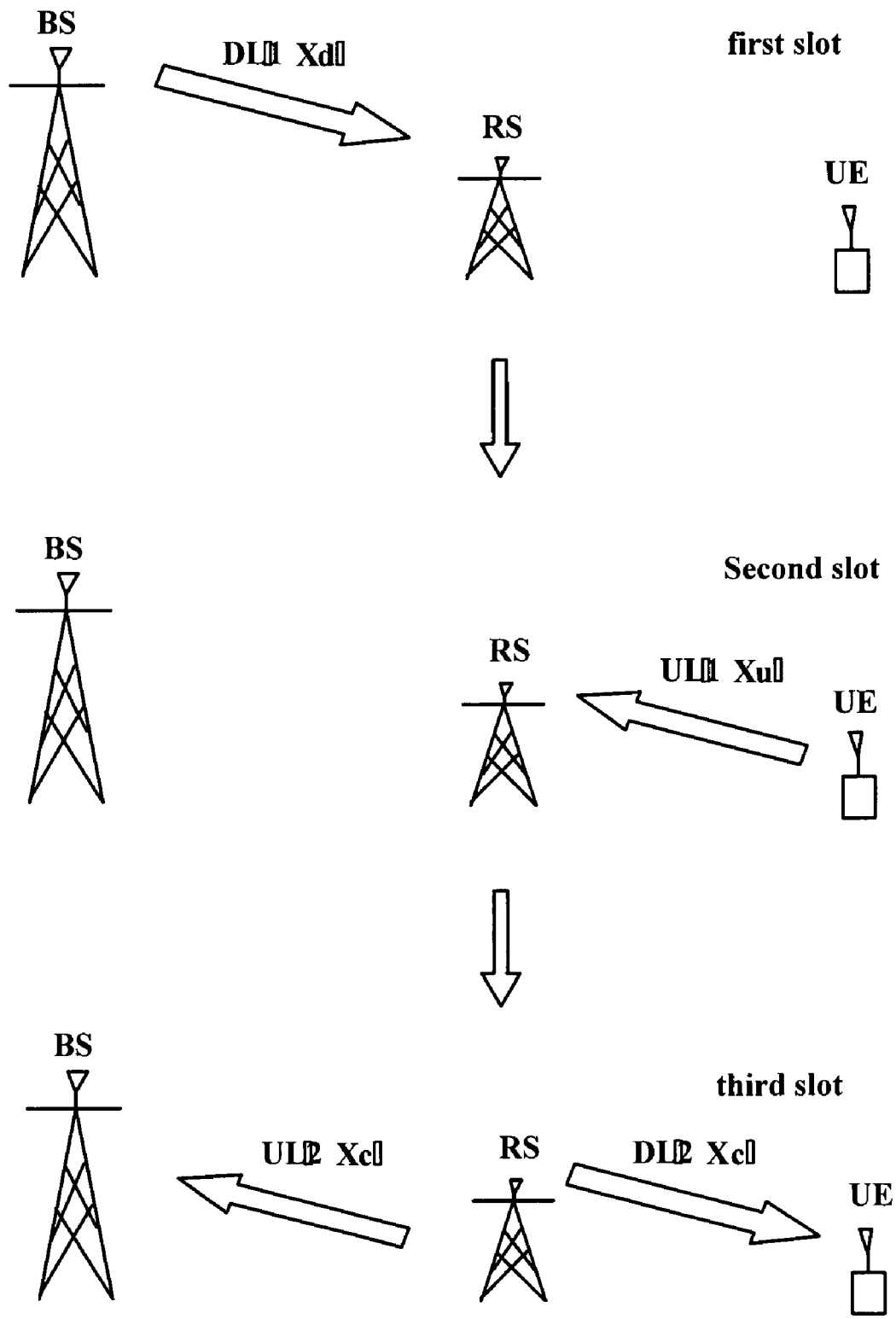
FIG. 3 is a diagram showing a principle of a second communication method in a cellular network based on RS in prior art.
Figure 4:
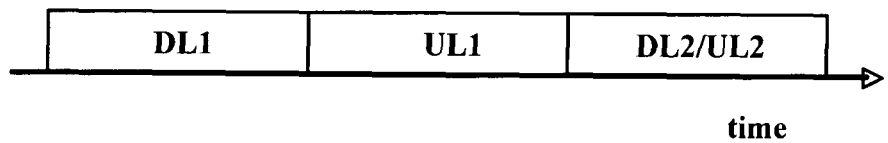
FIG. 4 is a schematic diagram showing a slot allocation in the communication method shown in FIG. 3.

An embodiment of the present invention comprises a cellular network based on a relay station (RS). Another embodiment of the present invention includes a space division duplex communication method.

According to a first embodiment of the present invention, a cellular network based on a RS is provided, including a base station, a relay station and a user equipment, wherein the base station has at least one antenna and the relay station has at least two antennas. The base station allocates resources for the user equipment, transmits a downlink signal in a current slot and receives an uplink signal from the user equipment through the relay station in the next slot. The relay station receives the downlink signal from the base station and the uplink signal from the user equipment in the current slot and transmits the received downlink signal to the user equipment and the uplink signal to the base station in the next slot. The user equipment transmits the uplink signal in the current slot and receives the downlink signal through the relay station in the next slot, wherein the uplink signal and the downlink signal transmitted in the same slot are orthogonal.

According to a second embodiment of the present invention, a space division duplex communication method is provided and includes the following operations: at a base station, transmitting a broadcasting signal and allocating resources for a user equipment according to a feedback signal corresponding to the broadcasting signal; transmitting a downlink signal from the base station and an uplink signal from the user equipment to a relay station in a current slot; at the relay station, transmitting the downlink signal received from the base station to the user equipment and the uplink signal received from the user equipment to the base station in the next slot, wherein the uplink signal and the downlink signal transmitted in the same slot are orthogonal.

According to a third embodiment of the present invention, a cellular network based on RS is provided, including a base station, a first relay station, a second relay station and a user equipment, wherein the base station has at least one antenna and each relay station has at least two antennas. The base station allocates resources for the user equipment, transmits a downlink signal in a current slot and receives an uplink signal from the first relay station in the next slot. The first relay station receives the downlink signal from the base station and the uplink signal from the second relay station in the current slot and transmits the downlink signal to the second relay station and the uplink signal to the base station in the next slot. The second relay station transmits the uplink signal to the first relay station and the downlink signal to the user equipment in the current slot and transmits the received downlink signal to the user equipment and the received uplink signal to the first relay station in the next slot. The user equipment receives the downlink signal from the second relay station in the current slot and transmits the uplink signal in the next slot, wherein the uplink signal and the downlink signal transmitted in the same slot are orthogonal.

According to a second embodiment of the present invention, a space division duplex communication method is provided and includes the following operations: at a base station, transmitting a broadcasting signal and allocating resources for a user equipment according to a feedback signal corresponding to the broadcasting signal; transmitting a downlink signal from the base station to a first relay station, and at the same time, transmitting from a second relay station an uplink signal to the first relay station and a downlink signal to a user equipment; at the first relay station, transmitting the downlink signal received from the base station to the second relay station and the uplink signal received from the second relay station to the base station in the current slot to the base station in the next slot, and at the same time, transmitting the uplink signal from the user equipment to the second relay station, wherein the uplink signal and the downlink signal transmitted in the same slot are orthogonal.

According to a fifth embodiment of the present invention, a cellular network based on RS is provided, including a base station, a plurality of relay stations and a user equipment, wherein the base station has at least one antenna and each relay station has at least two antennas. At least one relay station among the plurality of relay stations receives a downlink signal from the base station or from the other relay stations and an uplink signal from the user equipment or from the other relay stations in the current slot, and transmits the received downlink signal to the other relay stations or to the user equipment and the received uplink signal to the other relay stations or to the base station in the next slot. And at least one relay station among the plurality of relay stations transmits the downlink signal to the other relay stations or to the user equipment and the uplink signal to the other relay stations or to the base station in the current slot, and receives the downlink signal from the base station or from the other relay stations and the uplink signal from the user equipment or from the other relay stations in the next slot, wherein the uplink signal and the downlink signal transmitted in the same slot are orthogonal.

Compared with the prior art, the advantages of embodiments of the present invention include:

1) uplink and downlink signals can be transmitted and received at the same time with the space independence between links created geographically and the RS with multiple antennas, which can effectively improve the use efficiency of each channel;

2) furthermore, the RS can make a beam coefficient of the downlink and/or uplink signal estimated in the current slot as a beam coefficient of the downlink and/or uplink signal in the next slot, which reduces the system complexity; and 3) the uplink and downlink transmission for a one-hop user and a multi-hop user only needs two independent slots and when allocating slot resources no special processing is needed, which simplify the system design.

A main idea of the present invention includes a cellular network based on relay station (RS) and a space division duplex communication method, wherein uplink and downlink can be multiplexed with the space independence between links created geographically and the multi-antenna RS, which can effectively improve the use efficiency of each channel and the network performance.

Then the cellular network based on RS and the space division duplex communication method will be described with reference to the drawings.

A First Embodiment

Figure 5:
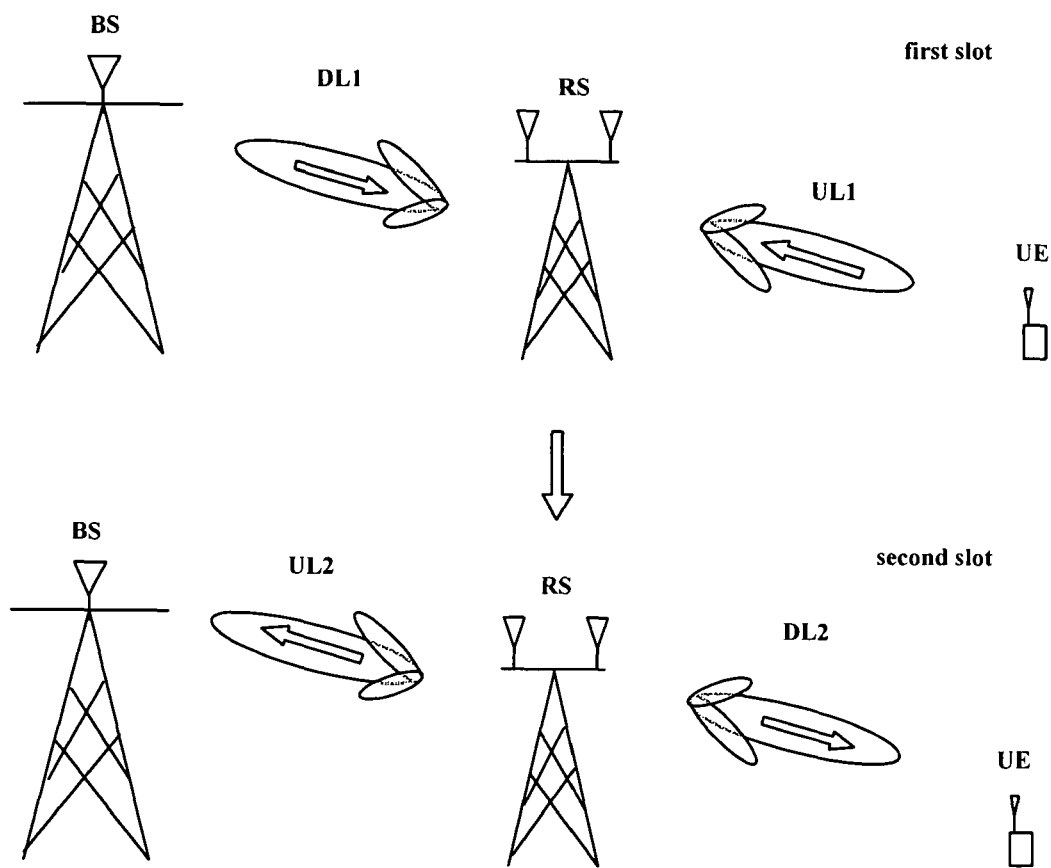
FIG. 5 is a schematic diagram showing a configuration of a cellular network based on RS according to a first embodiment of the present invention.

FIG. 5 is a schematic diagram showing a configuration of a cellular network based on RS according to a first embodiment of the present invention. This embodiment shows a case where the UE is of a two-hop user. As shown in FIG. 5, the cellular network based on RS includes a base station, a RS and a UE, wherein the base station has at least one antenna and the RS has at least two antennas.

The base station transmits a broadcasting signal, receives a feedback signal corresponding to the broadcasting signal from the UE or from the RS, and allocates resources for the UE according to the feedback signal. Also, the base station transmits a downlink signal, receives an uplink signal from the UE or from the RS, and recovers uplink data from the UE.

The RS receives the broadcasting signal and the downlink signal from the base station, where the feedback signal corresponds to the broadcasting signal and the uplink signal from the UE. After receiving the broadcasting signal, the RS adds its identification information (such as the serial number of the RS) in the broadcasting signal and then transfers the broadcasting signal to the UE and correspondingly, after receiving the feedback signal corresponding to the broadcasting signal, the RS transfers the feedback signal to the base station. In addition, after receiving the downlink signal from the base station and/or the uplink signal from the UE in the current slot, the RS obtains the beam coefficient of the downlink signal according to the pilot signal of the downlink signal and the beam coefficient of the uplink signal according to the pilot signal of the uplink signal, transmits the uplink signal to the base station in the next slot using the beam coefficient of the downlink signal and transmits the downlink signal to the UE in the next slot using the beam coefficient of the uplink signal.

The UE receives the broadcasting signal and the downlink signal from the base station, including the broadcasting signal and the downlink signal transmitted directly from the base station, and/or those transferred from the RS. After receiving the broadcasting signal transmitted directly from the base station and/or that transferred from the RS, the UE determines whether itself is a one-hop user (covered by the base station directly) or a multi-hop user (covered by the RS) according to the information of the broadcasting signal such as the path loss or the SINR and feeds back a feedback signal corresponding to the broadcasting signal directly to the base station or the feedback signal is transferred by the RS to the base station.

Here, when the UE is s one-hop user, it will notify the base station about this. When the UE is a two-hop user, it will feed back the identification information (such as the serial number) of the RS covering the UE to the base station via the RS and further, the UE can feed back the feedback signal with the information of the RS (the path loss value or the SINR value etc.) to the base station.

Figure 6:
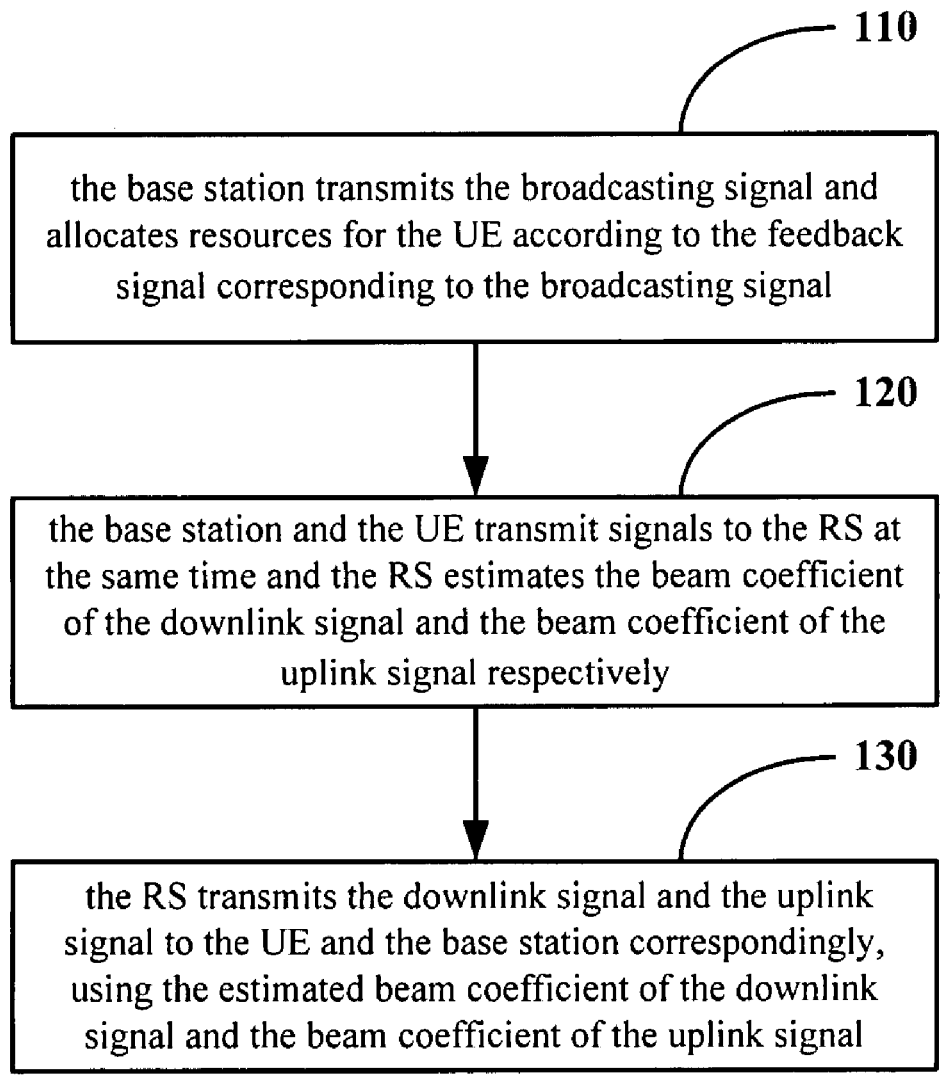
FIG. 6 is a flowchart showing a space division duplex communication method according to the first embodiment of the present invention.

FIG. 6 is a flowchart showing a space division duplex communication method according to the first embodiment of the present invention. As shown in FIG. 6, the space division duplex communication method according to the present embodiment includes the following steps:

In step 110, the base station transmits the broadcasting signal and allocates resources for the UE according to the feedback signal corresponding to the broadcasting signal. In a case when the UE is a two-hop user, the resources allocated by the base station are two slots. After the resources are allocated, the UE, the RS and the base station begin to communicate.

In step 120, in the first slot, the base station and the UE transmit signals to the RS at the same time and since the RS has two antennas, it can receive the downlink signal from the base station and the uplink signal from the UE at the same time, wherein the downlink signal from the base station and the uplink signal from the UE are orthogonal.

In step 130, in the second slot, the RS transfers the downlink signal received in the first slot from the base station to the UE and at the same time, transfers the uplink signal received in the first slot from the UE to the base station. Since the RS has a function of buffering data, the signal transmitted in the second slot can be that received in the first slot or previously.

Figure 7:
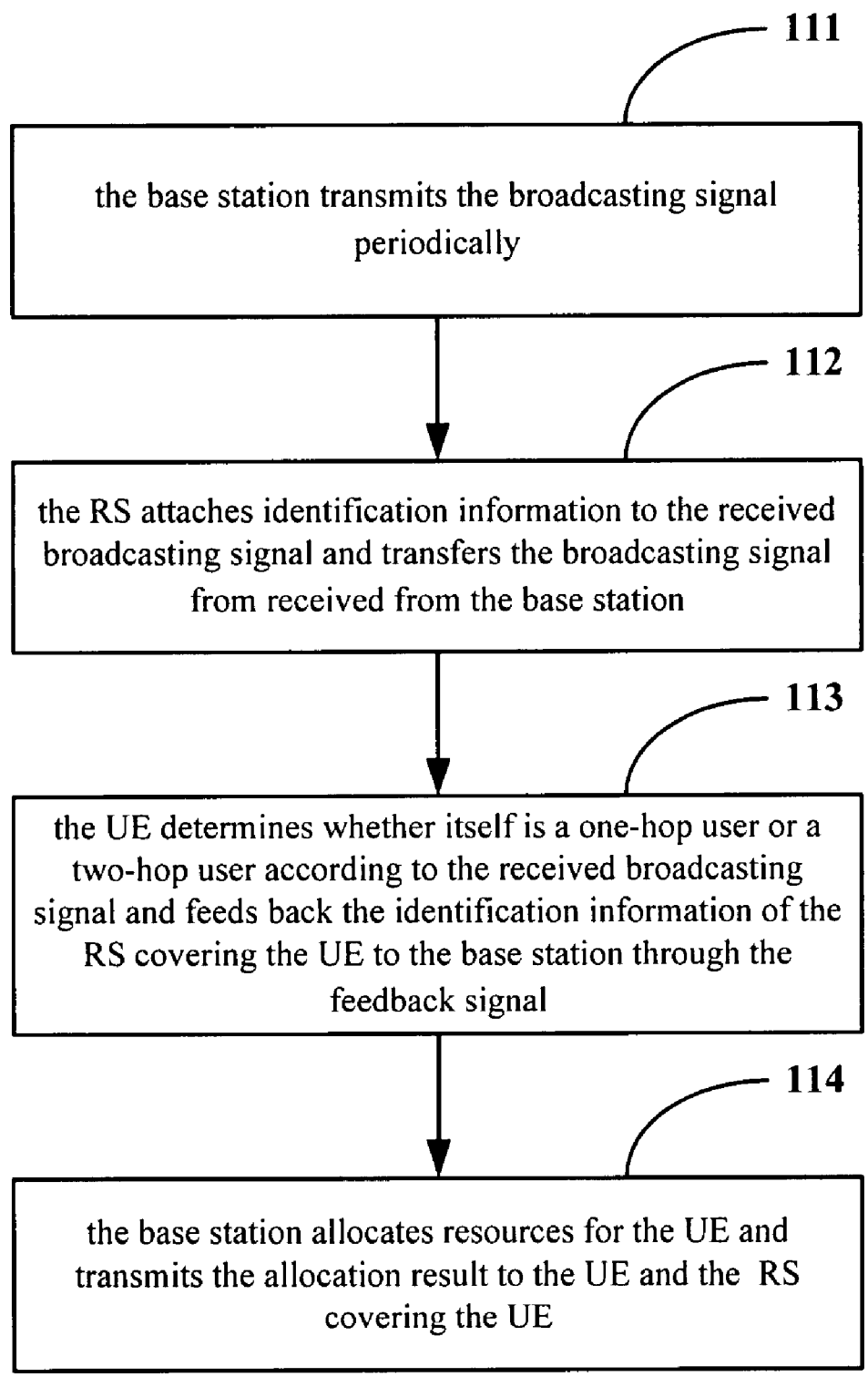
FIG. 7 is a flowchart showing a resource allocation performed by a base station according to the first embodiment of the present invention.

Furthermore, as shown in FIG. 7, when the base station allocates resources for the UE in step 110, the following steps are performed:

In step 111, the base station transmits the broadcasting signal periodically;

In step 112, the RS attaches identification information such as its serial number that uniquely identifies itself to the received broadcasting signal and transfers the broadcasting signal from the base station; and In step 113, the UE attempting to access the network receives the broadcasting signals from the base station and all RSs, measures the corresponding path loss or SINR respectively, determines whether itself is a one-hop user (covered by the base station) or a two-hop user (covered by a RS) according to the measured path loss or SINR and feeds back the feedback signal corresponding to the broadcasting signal directly to the base station or the feedback signal is transferred by the RS to the base station.

When the UE is a two-hop user, it will feed back the feedback signal with the identification information of the RS covering the UE to the base station and the feedback signal can further include the minimum path loss value or the maximum SINR value of the RS covering the UE.

In step 114, the base station allocates resources for the UE and transmits the allocation result to the UE and the RS covering the UE.

Here, when the UE is a one-hop or a multi-hop user, the resources allocated by the base station to the UE are two slots.

In step 114, before the base station allocates resources for the UE, it can notify the RS covering the UE to determine whether interference between the received downlink signal and the uplink signal is lower than a predetermined threshold and to feed back the determining result to the base station.

If the determining result is that the interference is lower than the predetermined threshold, the space division duplex communication method of the present embodiment can be adopted and the base station allocates two slots for the UE. If the determining result is that the interference is higher than the predetermined threshold, the methods of the prior arts can be adopted, for example, in the first communication method of the prior art the base station allocates four slots for the UE and in the second communication method of the prior art the base station allocates three slots for the UE and then communication continues with the communication method of the prior art.

In addition, in step 120, after receiving the above signals in the first slot, the RS can further estimate the beam coefficient of the downlink signal according to the pilot signal of the downlink signal from the base station and the beam coefficient of the uplink signal according to the pilot signal of the uplink signal from the UE respectively.

In step 130, by further using the estimated the beam coefficient of the downlink signal from the base station and the beam coefficient of the uplink signal from the UE in the first slot, the RS can make the estimated beam coefficient of the downlink signal as the transmitting coefficient of the uplink signal, make the estimated beam coefficient of the uplink signal as the transmitting coefficient of the downlink signal and transmits the downlink signal received from the base station and the uplink signal received from the UE to the UE and the base station respectively.

It can be seen in the method according to the present embodiment, the use efficiency of each channel is 2 links per slot. Compared with the communication method in prior art, since the space division duplex communication method of the present embodiment makes fully use of the space orthogonality between the uplink signal and the downlink signal, the RS can receive the downlink signal from the base station and the uplink signal from the UE in the same slot at the same time and can transmit the downlink signal and the uplink signal in the same slot at the same time, which can effectively improve the use efficiency of each channel and the network performance.

In order to better understand the effect of the present embodiment, the method of the prior art and the one of the present embodiment in the same condition will be compared, wherein, it is assumed that the method of the prior art and the one of the present embodiment are both applied to the space division duplex communication.

A First Example Comparison

Figure 8:
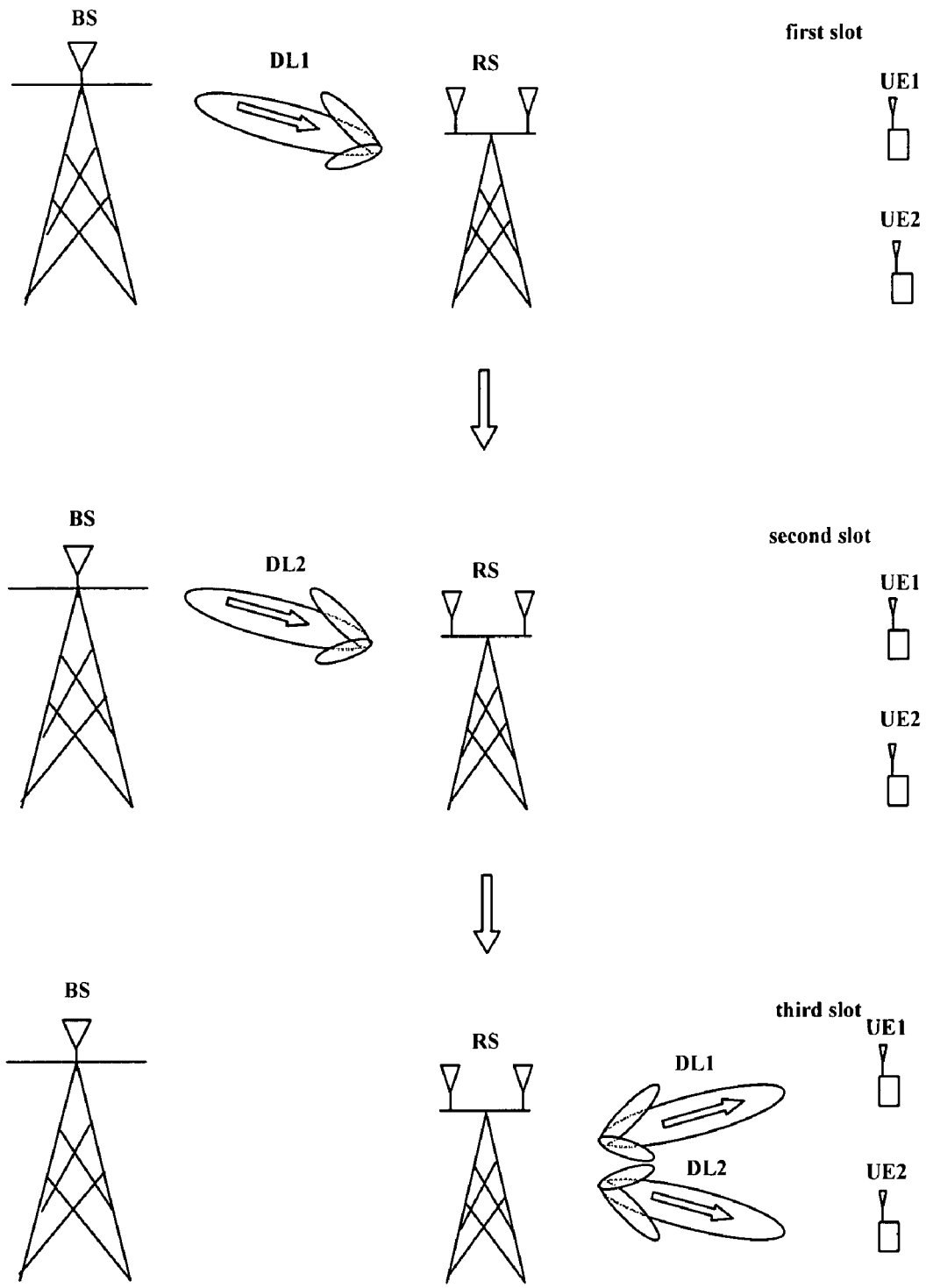
FIG. 8 is a flowchart showing a communication method of the prior art in a first comparing example according to the first embodiment of the present invention.

In the first example comparison, it is assumed that the base station has one antenna and the RS has two antennas. As shown in FIG. 8, in the method of the prior art, the base station can only transmit the downlink signal to the RS in the first and the second slots respectively, which is because in the multi-antenna system of the prior art, when the orthogonality between the downlink and uplink signals is not taken into account, the number of the links transmitting at the same time is limited by the minimum number between the transmitting antennas and the receiving antennas. Therefore, although the RS has two antennas, it cannot transmit in the downlink and the uplink at the same time.

In the third slot, the RS transmits the downlink signal to the two different UEs at the same time, and the communication system equals to a multi-antenna system with two transmitting antennas and two receiving antennas. In this case, the use efficiency of each channel of the prior art is 4 links/3 slots.

Then FIG. 6 is referred to describe the communication method of one embodiment of the present invention.

In the first slot, the base station and the UE transmit the downlink signal and to the RS respectively at the same time and with the same frequency resource, and the RS measures the beam coefficients of the downlink signal and the uplink signal according to pilot signals of the received signals respectively;

In the second slot, the RS transmits the received uplink signal to the base station using the beam coefficient of the downlink signal measured in the first slot as the transmitting coefficient, and transmits the received uplink signal to the UE using the beam coefficient of the uplink signal measured in the first slot as the transmitting coefficient. Since the RS has the function of buffering data, the signals transmitted in the second slot can be the one received in the first slot or previously.

Then it can be obtained that the use efficiency of each channel is 2 links per slot.

A Second Example Comparison

Figure 9:
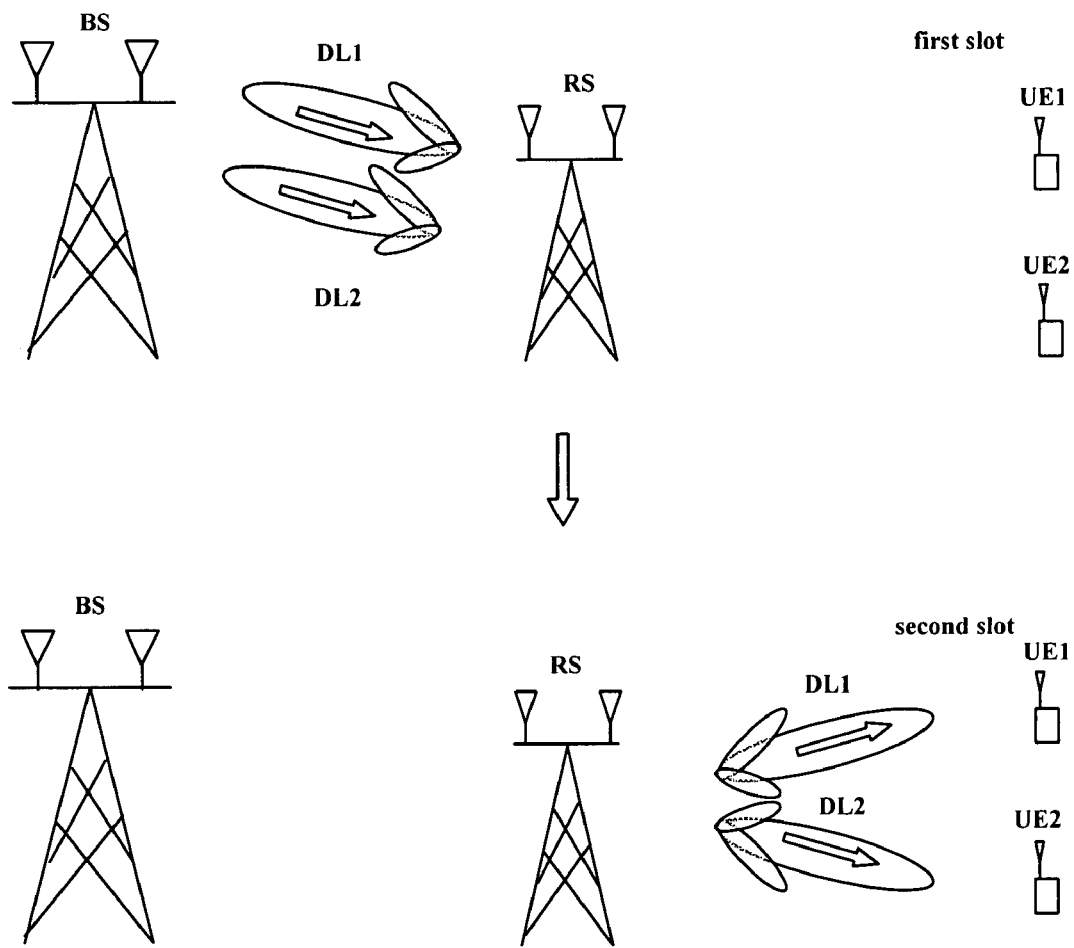
FIG. 9 is a flowchart showing a communication method of the prior art in a second comparing example according to the first embodiment of the present invention.

In the second example comparison, the base station and the RS both have two antennas, and therefore the communication system can use two links to transmit, for example, two downlinks or two uplinks at the same time. As shown in FIG. 9, in the method of the prior art, in the first slot, the base station transmits two downlink signals to the RS at the same time and the RS receives the two downlink signals; in the second slot, the RS transmits the two downlink signals to the two corresponding UEs. Since the uplink and the downlink are symmetrical, here only the downlink is taken to illustrate. In this case, the use efficiency of each channel of the prior art is 2 links per slot.

In addition, the base station in FIG. 9 can communicate with two RSs at the same time, i.e. in the first slot, the base station transmits two downlink signals to the two RSs at the same time respectively and in the second slot, the each RS transfers the corresponding downlink signal to the corresponding UE.

Figure 10:
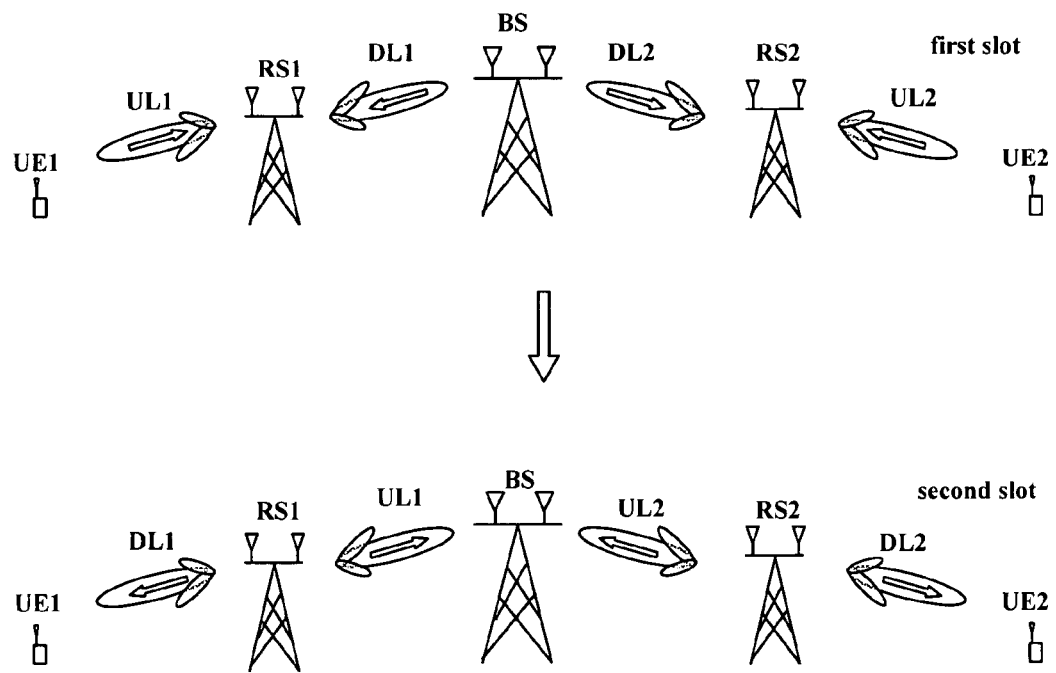
FIG. 10 is a flowchart showing the space division duplex communication method in a second comparing example according to the first embodiment of the present invention.

As shown in FIG. 10, in the communication method of the present embodiment, when the base station has a plurality of antennas, the base station can cooperate with different RSs, i.e. when the orthogonality between the downlink and uplink signals are taken into account, the RS can receive the downlink signal from the base station and the uplink signal from the UE at the same time and can transmit the downlink signal and the uplink signal in the same slot at the same time. Therefore, a base station having two antennas can communicate with two RSs each having two antennas, which improves the use efficiency.

In FIG. 10, the base station and each RS have two antennas. In the first slot, the base station transmits downlink signals DL 1 and DL 2 to RS 1 and RS 2 respectively; at the same time, UE 1 transmits an uplink signal UL1 to RS 1 and UE 2 transmits an uplink signal UL2 to RS 2. Furthermore, RS 1 and RS 2 measure the beam coefficient of the signals from the base station and from the UE respectively.

In the second slot, the RSs transfer the signals from the base station and from the UEs at the same time. That is, RS 1 transmits the uplink signal UL 1 from UE1 to the base station and the downlink signal DL 1 from the base station to UE 1 respectively and RS 2 transmits the uplink signal UL 2 from UE2 to the base station and the downlink signal DL 2 from the base station to UE 2 respectively.

At this time the use efficiency of each channel is 4 links per slot.

The above comparison shows that compared with the prior art, the system and method according to the first embodiment of the present invention can effectively improve the use efficiency of each channel and the system performance.

The above comparison only shows the case when a UE is a one-hop or two-hop user. The second embodiment will show the case when a UE is a three-or -more-hop user.

A Second Embodiment

Figure 11:
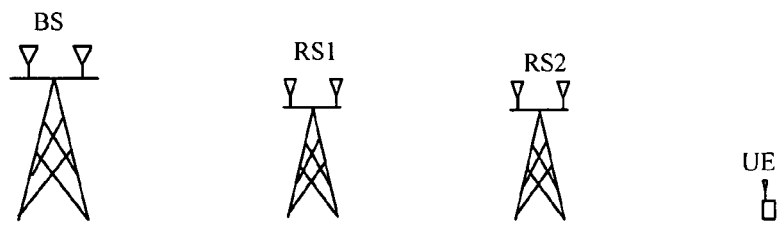
FIG. 11 is a schematic diagram showing a configuration of a cellular network based on RS according to a second embodiment of the present invention.

FIG. 11 is a schematic diagram showing a configuration of a cellular network based on RS according to a second embodiment of the present invention. This embodiment shows the case when a UE is a three-hop user. As shown in FIG. 11, the cellular network based on RS includes a base station, a first RS 1, a second RS 2 and a UE, wherein the base station has at least one antenna and each RS has at least two antennas.

The base station transmits a broadcasting signal to RS 1, receives a feedback signal corresponding to the broadcasting signal from RS 1, and allocates resources for the UE according to the feedback signal. Also, the base station transmits a downlink signal to RS 1, receives an uplink signal from RS 1, and recovers the uplink signal for the UE.

RS 1 receives the broadcasting signal and the downlink signal from the base station, the feedback signal corresponding to the broadcasting signal and the uplink signal from RS 2. After receiving the broadcasting signal, RS 1 adds its identification information (such as the serial number) in the broadcasting signal and then transfers the broadcasting signal to RS 2 and correspondingly, after receiving from RS 2 the feedback signal corresponding to the broadcasting signal, RS 1 transfers the feedback signal to the base station. In addition, after receiving the downlink signal from the base station or the uplink signal transferred from RS 2 in the current slot, RS 1 will transmit the downlink signal from the base station and/or the uplink signal transferred from RS 2 to RS 2 and/or the base station respectively in the next slot.

RS 2 receives the broadcasting signal and the downlink signal from RS 1, the feedback signal corresponding to the broadcasting signal, and the uplink signal from the UE. After receiving the broadcasting signal from RS 1, RS 2 adds its identification information (such as the serial number) in the broadcasting signal and then transfers the broadcasting signal to the UE and correspondingly, after receiving the feedback signal corresponding to the broadcasting signal, RS 2 transfers the feedback signal to RS 1. In addition, after receiving the downlink signal from RS 1 and/or the uplink signal from the UE in the current slot, RS 2 will transmit the uplink signal from the UE and/or the downlink signal from RS 1 to RS 1 and/or the UE respectively in the next slot.

The UE receives the broadcasting signal and the downlink signal from RS 2, and transmits the feedback signal corresponding to the broadcasting signal and the uplink signal to RS 2. After receiving the broadcasting signal from RS 2, the UE determines the number of hops of itself according to the path loss or the SINR of the broadcasting signal. In this embodiment, the UE determines itself is covered by RS 2 so it is the three-hop user. Then the UE feeds back the feedback signal with an identification information (such as the serial number) of RS 2 covering the UE to RS 2 and the UE can further feed back the path loss value or the SINR value to RS 2 through the feedback signal.

Figure 12:
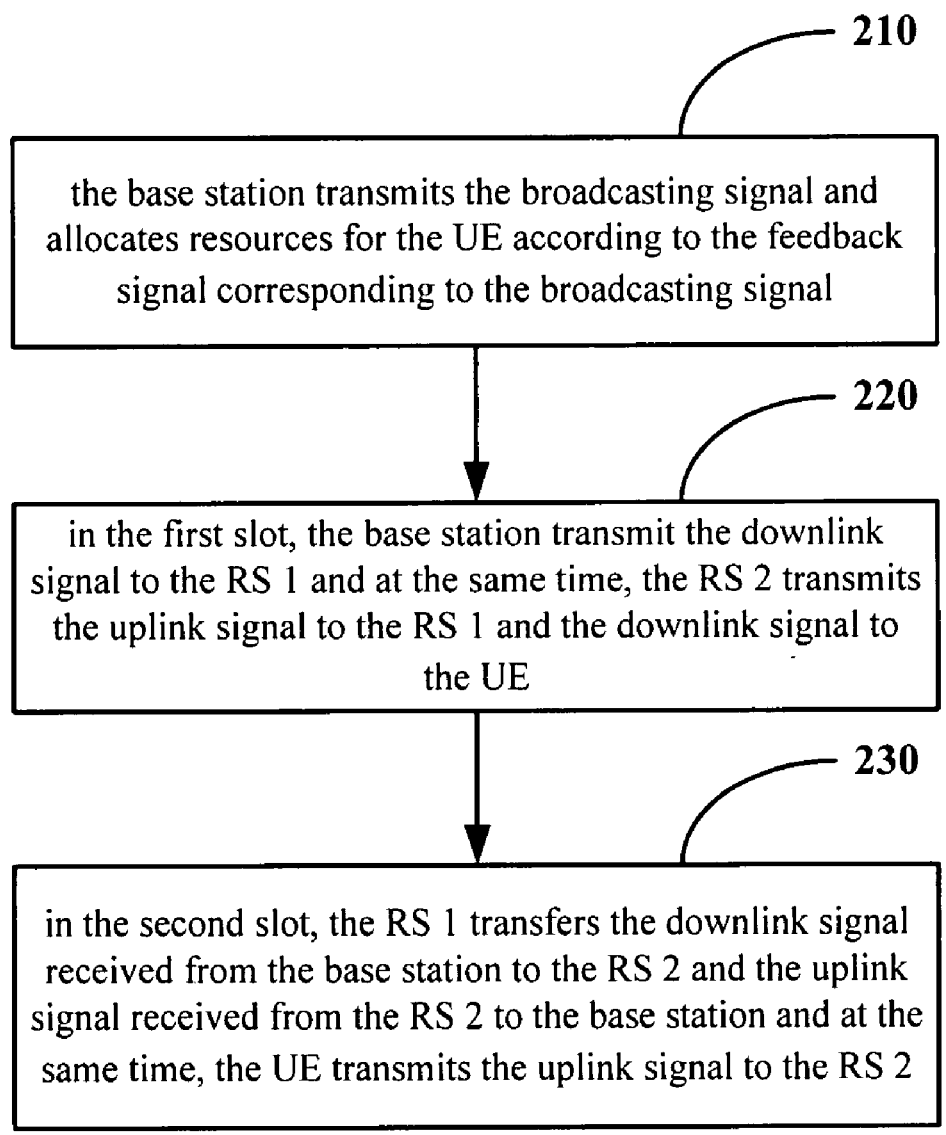
FIG. 12 is a flowchart showing a space division duplex communication method according to the second embodiment of the present invention.

FIG. 12 is a flowchart showing a space division duplex communication method according to the second embodiment of the present invention. As shown in FIG. 12, the space division duplex communication method according to the present embodiment includes the following steps:

In step 210, the base station transmits a broadcasting signal and allocates resources for the UE according to a feedback signal corresponding to the broadcasting signal. In a case when the UE is a three-hop user, the resources allocated by the base station are two slots. After the resources are allocated, the UE, the RS and the base station begin to communicate.

In step 220, in the first slot, the base station transmits a downlink signal to RS 1 and at the same time, RS 2 transmits an uplink signal to RS 1 and a downlink signal to the UE.

In step 230, in the second slot, RS 1 transfers the downlink signal received from the base station to RS 2 and the uplink signal received from RS 2 to the base station and at the same time, the UE transmits an uplink signal to RS 2.

The above description is based on the assumption that the base station has only one antenna. When the base station has two or more than two antennas, the situation is quite similar and the number of the antennas of RS 2 only needs to be more than or equal to that of the base station. For example, when the number of antennas of the base station is two, each RS has to have at least two antennas so that when the base station transmits downlink signals, the number of which equals to that of the antennas, to the same RS in the first slot at the same time, each antenna of the RS receives a corresponding downlink signal. Of course, the base station can make the downlink signal transmitted by each antenna correspond to a RS, i.e. when the base station has two antennas, the downlink signal transmitted by one is received by its corresponding RS and altogether there are two independent RSs for receiving the downlink signals transmitted from different antennas of the base station.

Figure 13:
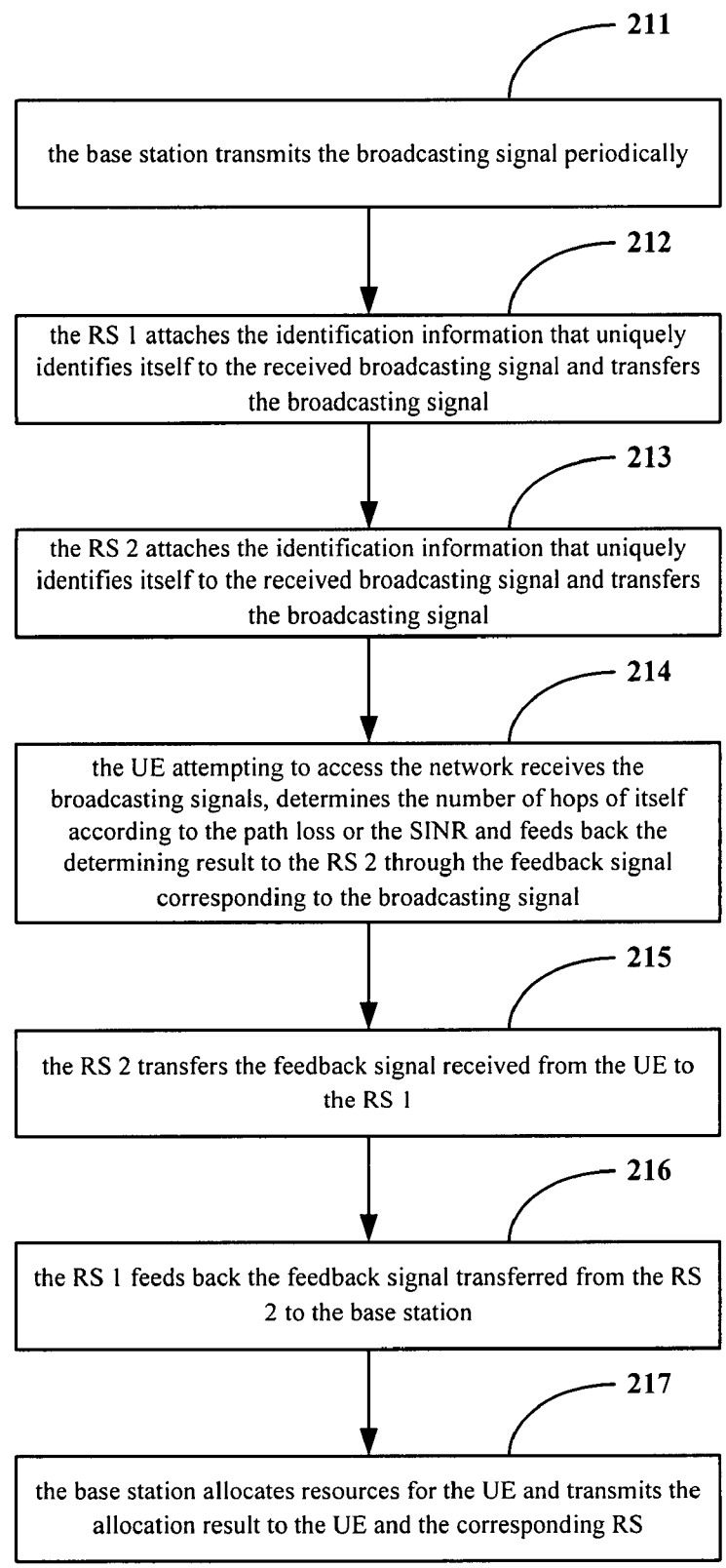
FIG. 13 is a flowchart showing a resource allocation performed by a base station according to the second embodiment of the present invention.

Furthermore, as shown in FIG. 13, when the base station allocates resources for the UE in step 210, there are the following steps:

In step 211, the base station transmits the broadcasting signal periodically;

In step 212, RS 1 attaches the identification information such as its serial number that uniquely identifies itself to the received broadcasting signal and transfers the broadcasting signal from the base station;

In step 213, RS 2 attaches the identification information such as its serial number of RS 2 that uniquely identifies itself to the received broadcasting signal and transfers the broadcasting signal;

In step 214, the UE attempting to access the network receives the broadcasting signal, measures the path loss or SINR, determines the number of hops of itself according to the measured path loss or SINR and feeds back the determining result to RS 2 by use of the feedback signal corresponding to the broadcasting signal. In the second embodiment of the present invention, the UE is a three-hop user. The feedback signal includes the identification information of the RS covering the UE, and further can include the minimum path loss value or the maximum SINR value.

In step 215, RS 2 transfers the feedback signal received from the UE to RS 1.

In step 216, RS 1 feeds back the feedback signal transferred from RS 2 to the base station.

In step 217, the base station allocates resources for the UE and transmits the allocation result to the UE and the corresponding RS. Here the UE is a three-hop user and the base station allocates 2 slots to the UE.

In step 217, before the base station allocates resources for the UE, it can notify the RS covering the UE to determine whether interference between the received downlink signal and uplink signal is lower than the predetermined threshold and to feed back the determining result to the base station.

If the determining result is that the interference is lower than the predetermined threshold, the space division duplex communication method of the present invention can be adopted and the base station allocates two slots for the UE. If the determining result is that the interference is higher than the predetermined threshold, the methods of the prior arts can be adopted.

In addition, in step 220, after receiving the above signals in the first slot, RS 1 can further estimate the beam coefficient of the downlink signal from the base station according to the pilot signal of the downlink signal, and the beam coefficient of the uplink signal from RS 2 according to the pilot signal of the uplink signal from RS 2 respectively.

In step 230, by further using the estimated the beam coefficient of the downlink signal from the base station and the beam coefficient of the uplink signal from RS 2 in the first slot, RS 1 can make the estimated beam coefficient of the downlink signal as the transmitting coefficient of the uplink signal in the current slot, make the estimated beam coefficient of the uplink signal as the transmitting coefficient of the downlink signal in the current slot and transmits the downlink signal received from the base station and the uplink signal received from RS 2 in the first slot to RS 2 and the base station respectively.

It can be seen in the method according to the present embodiment, the use efficiency of each channel is 3 links per slot. Compared with the communication method in prior art, since the space division duplex communication method of the present embodiment makes fully use of the space orthogonality between the uplink signal and the downlink signal, the RS can receive the downlink signal and the uplink signal in the same slot at the same time and can transmit the downlink signal and the uplink signal in the same slot at the same time, which can effectively improve the use efficiency of each channel and the network performance.

In order to better understand the effect of the present embodiment, the method of the prior art and that of the present embodiment in the same condition will be compared, wherein, it is assumed that the method of the prior art and the one of the present embodiment are both applied to the space division duplex communication.

A First Example Comparison

Figure 14:
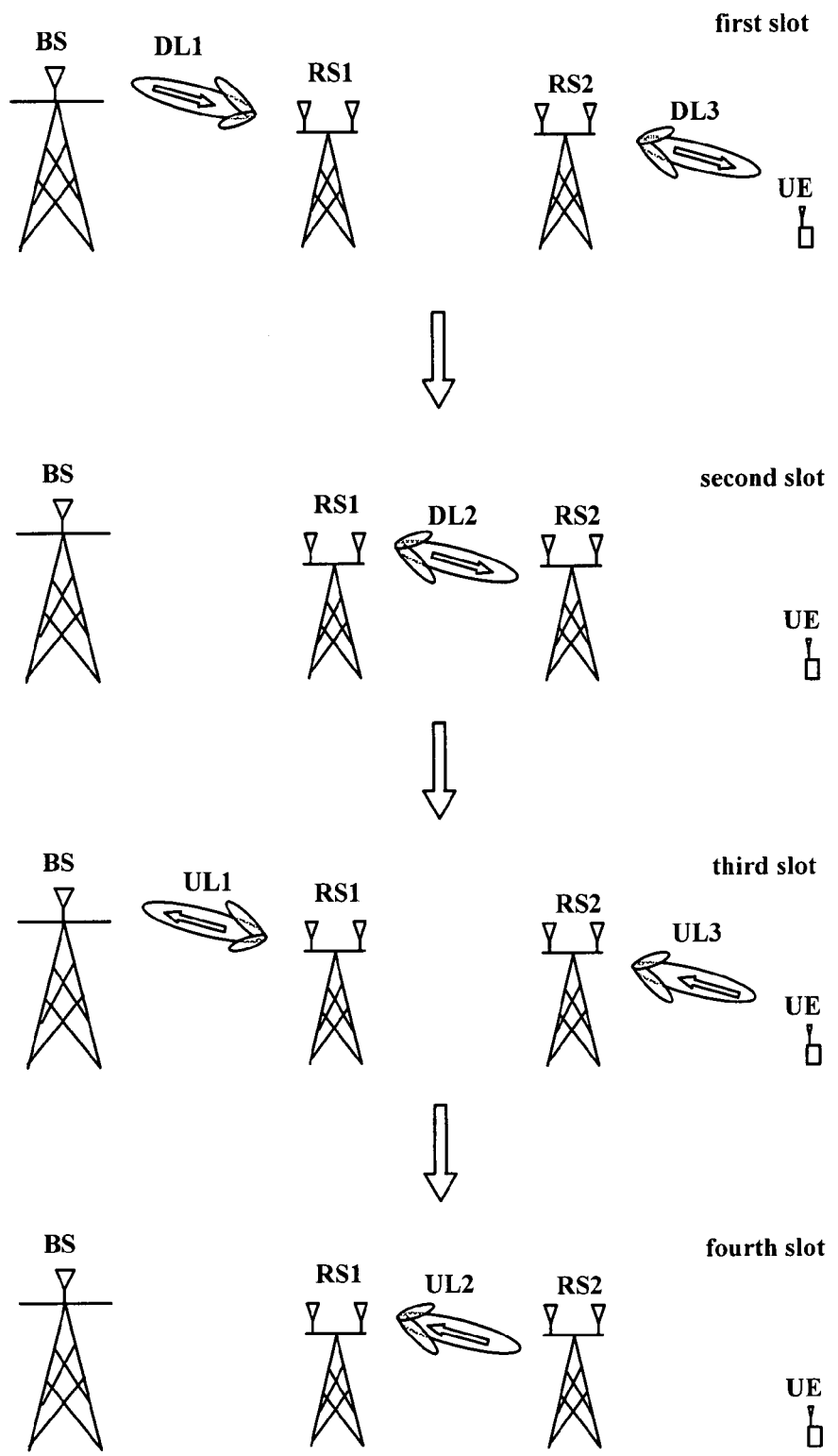
FIG. 14 is a flowchart showing a communication method of the prior art in a first comparing example according to the second embodiment of the present invention.

In the first example comparison, it is assumed that the base station has one antenna and each RS has at least two antennas. As shown in FIG. 14, in the method of the prior art, in the first slot, the base station transmits a downlink signal to RS 1 and at the same time RS 2 transmits a downlink signal to the UE; in the second slot, RS 1 transfers the downlink signal received from the base station to RS 2; in the third slot, RS 1 transfers a uplink signal to the base station and at the same time the UE transmits a uplink signal to RS 2; in the fourth slot, RS 2 transfers the uplink signal received from the UE to RS 1. With the above method, the use efficiency of each channel can reach 6/4 links per slot.

As the description on FIG. 12, in this case, the use efficiency of each channel can reach 6/2 links per slot by the communication method of the present embodiment, which is obviously higher than that obtained by the prior art.

A Second Example Comparison

Figure 15:
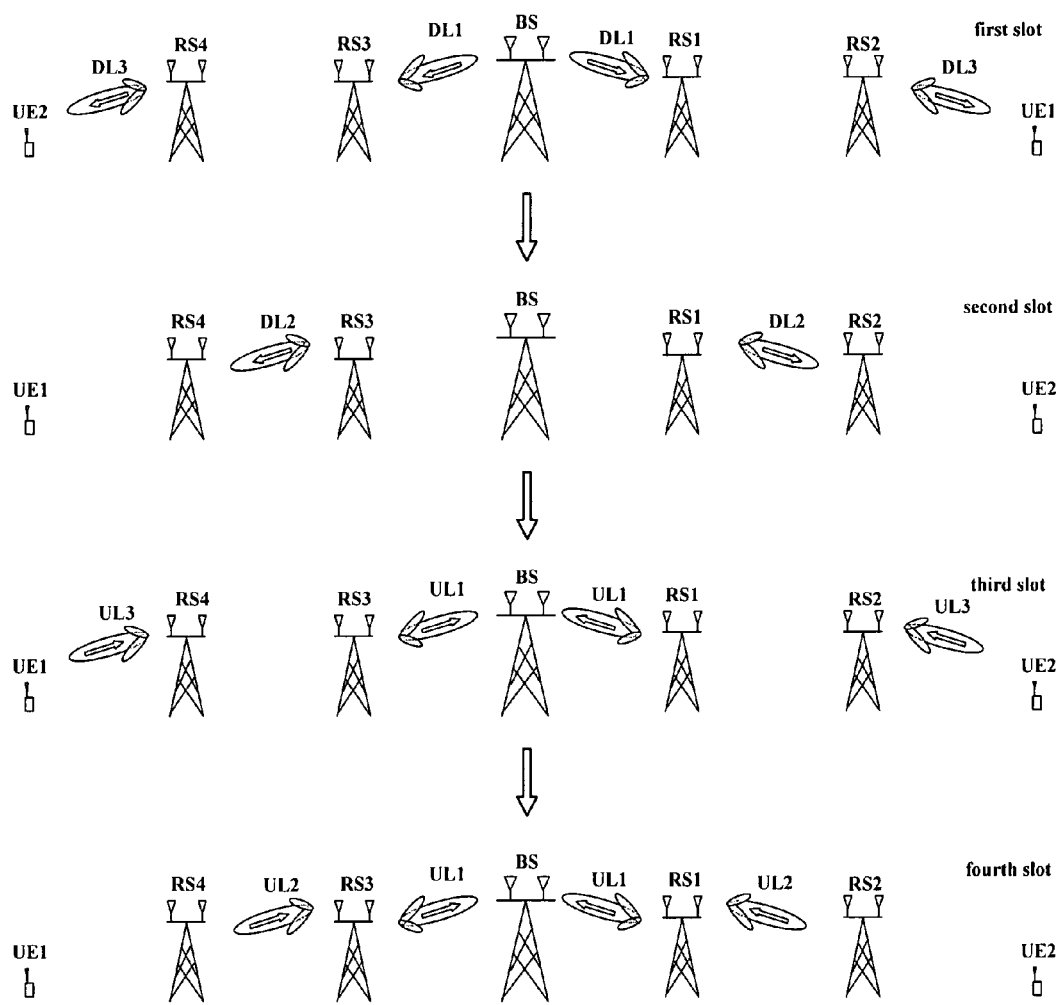
FIG. 15 is a flowchart showing a communication method of the prior art in a second comparing example according to the second embodiment of the present invention.

In the second example comparison, it is assumed that the base station has two antennas and each RS has at least two antennas, therefore the communication system can use two links to transmit, for example, two downlink signals or two uplink signals at the same time. As shown in FIG. 15, in the method of the prior art, in the first slot, the base station transmits two downlink signals to RS 1 and RS 3, each of RS 1 and RS 3 receives one of the two downlink signals transmitted from the base station respectively, at the same time, RS 2 transmits a downlink signal to UE 1 and RS 4 transmits a downlink signal to UE 2; in the second slot, RS 1 transmits the downlink signal received from the base station to RS 2 and RS 3 transmits the downlink signal received from the base station to RS 4; in the third slot, RS 2 transmits the downlink signal received from RS 1 to the UE 1, RS 4 transmits the downlink signal received from RS 3 to UE 2, RS 1 transmits an uplink signal to the base station and RS 3 transmits an uplink signal to the base station; in the fourth slot, RS 2 transmits the uplink signal received from UE 1 to RS 1 and RS 3 transmits the uplink signal received from UE 1 to RS 3. In this case, the use efficiency of each channel of the prior art is 12/3 links per slot.

Figure 16:
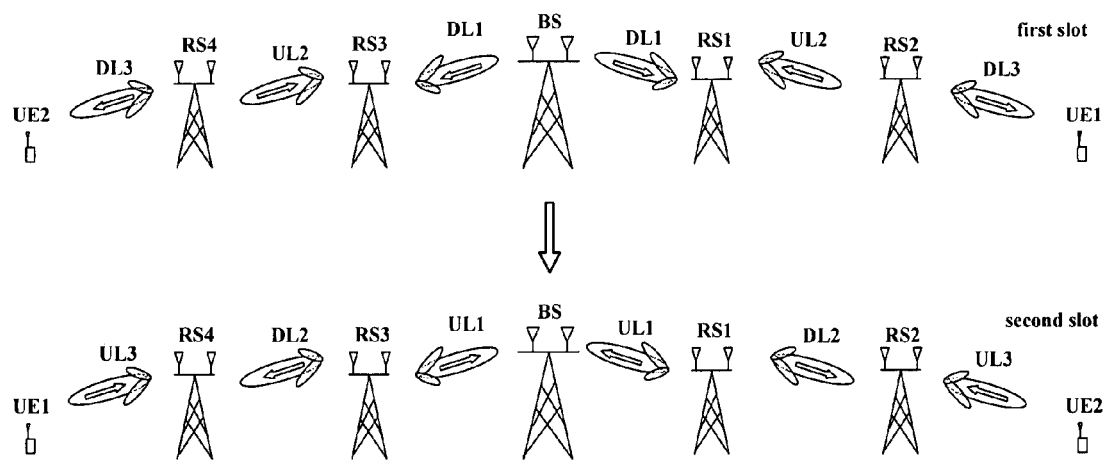
FIG. 16 is a flowchart showing the space division duplex communication method in a second comparing example according to the second embodiment of the present invention.

FIG. 16 shows in the communication method of the present embodiment, when the base station has a plurality of antennas, the base station can cooperate with different RSs, i.e. when the orthogonality between the downlink and uplink signals are taken into account, each RS can receive the downlink signal from the base station and the uplink signal from the UE at the same time and can transmit the downlink signal and the uplink signal in the same slot at the same time. Therefore, a base station having two antennas can communicate with two RSs, which improves the use efficiency.

In FIG. 16, it is assumed that the base station has two antennas and each RS has at least two antennas. In the first slot, the base station transmits different downlink signals to RS 1 and RS 3 respectively, RS 2 transmits an uplink signal to RS 1 and a downlink signal to UE 1 and RS 4 transmits an uplink signal to RS 3 and a downlink signal to UE 2; in the second slot, RS 1 transmits the downlink signal received from the base station to RS 2 and the uplink signal received from RS 2 to the base station, RS 3 transmits the downlink signal received from the base station to RS 4 and the uplink signal received from RS 4 to the base station, UE 1 transmits an uplink signal to RS 2 and UE 2 transmits an uplink signal to RS 4. And the use efficiency of each channel is 12/2 links per slot.

The above comparison shows that compared with the prior art, the system and method according to the second embodiment of the present invention can effectively improve the use efficiency of each channel and the system performance.

The above description shows the present invention is not limited to that the RS can transmit the uplink and downlink signals at the same time. The focus is that the uplink and downlink signals can be transmitted and received at the same time with the space independence between links created geographically and the RS with multiple antennas. Furthermore, the RS can make a beam coefficient of the downlink and/or uplink signal estimated in the current slot as a beam coefficient of the downlink and/or uplink signal in the next or subsequent slot. Therefore, for those skilled in the art, based on the prior art, the present invention can be extended to the case that the UE is beyond three hops.

Generally speaking, compared with the prior art, in the case that the UE is a multi-hop user, the present invention can effectively improve the use efficiency of each channel and the network performance. Furthermore, in the present invention no matter the UE is a one-hop user, a two-hop user or a three-hop user, the base station allocates two slots to the UE. Since the UE of the cellular network based on RS is usually a one-hop user, a two-hop user or a three-hop user, there is no need to perform the special processing on different cases, which can simplify the complexity in system design.

It should be appreciated that the descriptions are just embodiments rather than limitations to the present invention. It will be apparent to those skilled in the art that various modifications and variations can be made. Thus, it is intended that the present invention covers the modifications and variations of this invention provided they come within the scope of the appended claims and their equivalents.

The invention claimed is:

1. A cellular network based on relay station, comprising a base station, a relay station and a user equipment, wherein the base station has at least one antenna and the relay station has at least two antennas, wherein
the base station allocates resources for the user equipment, transmits a downlink signal in a current slot and receives an uplink signal from the user equipment through the relay station in the next slot;
the relay station receives the downlink signal from the base station and the uplink signal from the user equipment in the current slot and transmits the received downlink signal to the user equipment and the uplink signal to the base station in the next slot;
the user equipment transmits the uplink signal in the current slot and receives the downlink signal through the relay station in the next slot, and
wherein the uplink signal and the downlink signal transmitted in the same slot are orthogonal, and
wherein after receiving the downlink signal from the base station and the uplink signal from the user equipment in the current slot, the relay station obtains corresponding beam coefficients of the downlink and the uplink signals according to pilot signals of the downlink and the uplink signals, transmit the uplink signal to the base station in the next slot using the beam coefficient of the downlink signal obtained in the current slot and transmits the downlink signal to the user equipment in the next slot using the beam coefficient of the uplink signal obtained in the current slot.

2. A space division duplex communication method, comprising:
step a, at a base station, transmitting a broadcasting signal and allocating resources for a user equipment according to a feedback signal corresponding to the broadcasting signal;
step b, transmitting a downlink signal from the base station and an uplink signal from the user equipment to a relay station in a current slot;
step c, at the relay station, transmitting the downlink signal received from the base station to the user equipment and the uplink signal received from the user equipment to the base station in the next slot,
wherein the uplink signal and the downlink signal transmitted in the same slot are orthogonal, and wherein transmittinf the downlink signal from the base station comprises the relay station further estimates beam coefficients of the downlink and the uplink signals according to pilot signals of the downlink and the uplink signals in the current slot, and transmitting the downlink signals received from the user equipment to the base station in the next slot using the beam coefficient of the downlink signal obtained in the current slot and transmits the downlink signal received from the base station to the user equipment in the next slot using the beam coeffiecent of the uplink signal obtained in the current slot.

3. The method according to claim 2, wherein transmitting the broadcasting signal and allocating resources further comprises:
at the base station, transmitting the broadcasting signal periodically;
at the relay station, attaching an identification information to the received broadcasting signal and transferring the broadcasting signal from the base station;
at the user equipment, feeding back the feedback signal with the identification information of the relay station covering the user equipment to the base station; and
at the base station, allocating resources for the user equipment and transmitting the allocation result to the user equipment and the corresponding relay station.

4. The method according to claim 3, wherein the identification information comprises a serial number of the relay station.

5. The method according to claim 4, wherein the feedback signal further comprises a path loss value or a SINR value of the relay station covering the user equipment.

6. A cellular network based on relay station, comprising a base station, a first relay station, a second relay station and a user equipment, wherein the base station has at least one antenna and each relay station has at least two antennas, wherein
the base station allocates resources for the user equipment, transmits a downlink signal in a current slot and receives an uplink signal from the first relay station in the next slot;
the first relay station receives the downlink signal from the base station and the uplink signal from the second relay station in the current slot and transmits the downlink signal to the second relay station and the uplink signal to the base station in the next slot;
the second relay station transmits the uplink signal to the first relay station and the downlink signal to the user equipment in the current slot and transmits the received downlink signal to the user equipment and the received uplink signal to the first relay station in the next slot;
the user equipment receives the downlink signal from the second relay station in the current slot and transmits the uplink signal in the next slot,
wherein the uplink signal and the downlink signal transmitted in the same slot are orthogonal, and
wherein after receiving the downlink signal and the uplink signal in the current slot, the first and second relay stations obtain beam coefficients of the downlink and the uplink signals according to pilot signals of the downlink and the uplink signals, transmit the uplink signal in the next slot using the beam coefficient of the downlink signal and transmit the downlink signal in the next slot using the beam coefficient of the uplink signal.

7. A space division duplex communication method, comprising:
- at a base station, transmitting a broadcasting signal and allocating resources for a user equipment according to a feedback signal corresponding to the broadcasting signal;
- transmitting a downlink signal from the base station to a first relay station, and at the same time, transmitting from a second relay station an uplink signal to the first relay station and a downlink signal to a user equipment;
- at the first relay station, transmitting the downlink signal received from the base station to the second relay station and the uplink signal received from the second relay station to the base station in the current slot to the base station in the next slot, and at the same time, transmitting the uplink signal from the user equipment to the second relay station,
- wherein the uplink signal and the downlink signal transmitted in the same slot are orthogonal, and wherein
- transmitting the downlink signal from the base station comprises the first relay station further estimates corresponding beam coefficients of the downlink and the uplink signals according to pilot signals of the downlinks and the uplink signals in the current slot, and
- transmitting the downlink signal at the relay station comprises the first relay staion transmits the uplink signal received from the second relay station to the base station in the next slot using the beam coefficient of the downlink signal and transmits the downlink signal from the base station to the second relay station in the next slot using the beam coefficient of the uplink signal.

8. The method according to claim 7, wherein transmitting the broadcasting signal and allocating resources further comprises:
- at the base station, transmitting the broadcasting signal periodically;
- at the relay station, attaching an identification information to the received broadcasting signal and transferring the broadcasting signal from the base station;
- at the user equipment, feeding back the feedback signal with the identification information of the relay station covering the user equipment to the base station;
- at the base station, allocating resources for the user equipment and transmitting the allocation result to the user equipment and the corresponding relay station.

9. The method according to claim 8, wherein the identification information comprises a serial number of the relay station.

10. The method according to claim 9, wherein the feedback signal further comprises a path loss value or a SINR value of the relay station covering the user equipment.

11. A cellular network based on relay station, comprising a base station, a plurality of relay stations and a user equipment, wherein the base station has at least one antenna and each relay station has at least two antennas, wherein
- at least one relay station among the plurality of relay stations receives a downlink signal from the base station or from the other relay stations and an uplink signal from the user equipment or from the other relay stations in the current slot, and transmits the received downlink signal to the other relay stations or to the user equipment and the received uplink signal to the other relay stations or to the base station in the next slot; and
- at least one relay station among the plurality of relay stations transmits the downlink signal to the other relay stations or to the user equipment and the uplink signal to the other relay stations or to the base station in the current slot, and receives the downlink signal from the base station or from the other relay stations and the uplink signal from the user equipment or from the other relay stations in the next slot,
- wherein the uplink signal and the downlink signal transmitted in the same slot are orthogonal, and wherein
- transmitting the downlink signal from the base station comprises at least one relay station among the plurality of relay stations further estimates corresponding beam coefficients of the downlink and the uplink signals according to pilot signals of the downlink and the uplink signals in the current slot, and
- transmitting the downlink signal at the relay station comprises at least one relay station among the plurality of relay stations transmits the uplink signal received from another relay station among the plurality of relay stations to the base station in the next slot using the beam coefficient of the downlink signal and transmits the downlink signal from the base station to the another relay station among the plurality of relay stations in the next slot using the beam coefficient of the uplink signal.

* * * * *